Figure 1:
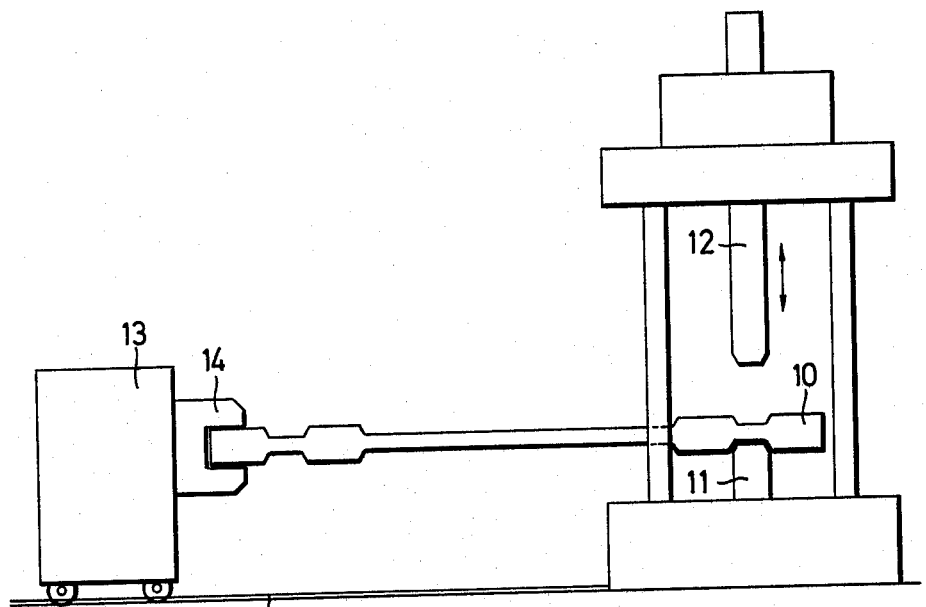

United States Patent [19]

Willenbrock et al.

[11] 4,084,418
[45] Apr. 18, 1978

[54] DEVICE FOR CONTROLLING THE MANIPULATOR MOVEMENTS IN A FORMING MACHINE, IN PARTICULAR IN A HAMMER FORGING PRESS

[75] Inventors: Walter Willenbrock, Leverkusen; Helmut Winkler, Meerbusch, all of Germany

[73] Assignee: Eumuco Aktiengesellschaft fur Maschinenbau, Leverkusen, Germany

[21] Appl. No.: 696,808

[22] Filed: Jun. 16, 1976

Related U.S. Application Data

[63] Continuation of Ser. No. 368,324, Jun. 8, 1973, abandoned.

[51] Int. Cl.² .................. B21D 43/10; B21J 13/12
[52] U.S. Cl. .................................. 72/31; 72/420; 72/422
[58] Field of Search ............ 72/7, 19, 29, 31, 420, 72/421, DIG. 4, 22, 422; 340/365 K; 317/112, 119; 339/420; 214/1 BB

[56] References Cited

U.S. PATENT DOCUMENTS

| | | | |
|---|---|---|---|
| 3,004,235 | 10/1961 | Cohen | 317/112 X |
| 3,167,978 | 2/1965 | Wistreich | 72/421 |
| 3,267,708 | 8/1966 | Sims | 72/421 |
| 3,410,001 | 11/1968 | Blum | 339/18 B X |
| 3,422,967 | 1/1969 | Aron | 214/1 BB |
| 3,435,650 | 4/1969 | Forster et al. | 72/29 |

FOREIGN PATENT DOCUMENTS

| | | | |
|---|---|---|---|
| 732,853 | 4/1966 | Canada | 72/421 |
| 2,143,669 | 3/1972 | Germany | 72/421 |

*Primary Examiner*—C.W. Lanham
*Assistant Examiner*—D. M. Gurley
*Attorney, Agent, or Firm*—Diller, Brown, Ramik & Wight

[57] ABSTRACT

The invention relates to a process and a device for controlling the manipulator movements in a forming machine, in particular a hammer-forging press, operating automatically in accordance with a workpiece program.

11 Claims, 5 Drawing Figures

DEVICE FOR CONTROLLING THE MANIPULATOR MOVEMENTS IN A FORMING MACHINE, IN PARTICULAR IN A HAMMER FORGING PRESS

This is a continuation of application Ser. No. 368,324 filed June 8, 1973, now abandoned.

It is known to employ, for controlling the manipulator movements, punched tapes in which the data for the tool to be manufactured are stored. The punched (perforated) tapes must at least contain data with regard to the lower ram dead-centre of the forging press, related to the individual manipulator feed positions. With this process, it is disadvantageous that the manufacture of the punched tape with a predetermined machine programme requires special programming knowledge and that subsequent checking of the programme and effecting of any corrections which may prove necessary are extremely difficult to effect.

Also known are mechanical scanning templates which are scanned during the operational step of the forging press and supply the coefficient data for the ram movements as a function of the manipulator travel-path. In this case, it is necessary to prepare for the workpiece a precisely true-to-dimension pattern in the form of a template. Subsequent changes require a considerable outlay of work. Additionally, storage of a large number of templates is frequently disadvantageous.

It is the object of the invention to indicate a process of the type mentioned at the outset which facilitates the preparation of programmes and the feeding thereof into the machine and in particular also permits programme variation without difficulty. This problem is, according to the invention, solved in that the workpiece data for each section of the workpiece and also the position data of the section are manually determined in a digital feed device, in the form of a signal group, in that the signal groups are converted, one after the other in predetermined sequence, to control signals for the forging press, and in that signal conversion of a signal group is not effected until the manipulator has reached the initial position of the associated section. If a plurality of forging passes is necessary — this may be the case for example in the event of considerable material reduction such as is not permissible within the forging stroke — a plurality of such programme cards, of correspondingly various design, may be operated one after the other by a suitable change-over logic system.

Thus, in the process accordingly to the invention, input of data or determination of the workpiece data is effected manually. Thus, it is merely necessary to set an indication as to what thickness the workpiece is to have in a predetermined section, which may also be indicated as a function of its initial value and its final value. The manipulator advance is, with this arrangement, effected automatically, save for those locations at which, according to the programme selected, it may be that a plurality of ram strokes is to be effected without manipulator transport.

A forging press operated in accordance with the process of the invention operates predominantly — in order to achieve short forging pass times — in accordance with the start-stop principle; on the contrary, the press ram effects, with continuous manipulator transport, ram movements with those data which have been introduced for the section of the workpiece concerned. At the same time, the advance position of the manipulator is continuously detected. If the programme set prescribes that, on reaching a predetermined advance position another ram movement is to be set, for example because the workpiece has a larger diameter at this location, then after reaching the set advance position signal change-over and input of the new control signal into the control device for the forging press are effected. In principle, manipulator transport can, however, according to the process of the invention, also be operated by stop-start methods, due to appropriate action on lines with the contacts (without forging strokes) to be discussed later. This could be necessary, in the case of a higher degree of forging accuracy.

A device for the carrying into effect of the process according to the invention is characterised in that the input device consists of a contact field in which contacts arranged group-wise are adapted to be selectively connected with connecting locations each of which corresponds to a workpiece size. The contact field is expediently divided-up into columns and lines. Adjacent the contact field are the connecting locations preferably arranged, with the entire contact field, on a replaceable plate. A group of contacts, each of which is capable of receiving the data for a section of the workpiece, comprises for example a line of contacts. Of the contacts of such a line, for example some having selected connecting locations for characterising the upper dead centre and others having connecting locations for characterising the lower dead centre of the press ram, are connected. Further contacts may serve for connection with selected connecting locations for the manipulator travel path, in order to determine the initial value of the workpiece section programme in this line, related to manipulator transport.

Furthermore, it is possible to indicate at further contacts whether, at each advance position, a repetition of the particular ram movement is to be effected or whether the manipulator tongs is to be rotated through a predetermined angle requiring to be individually indicated. Finally, it is possible, by switching a further contact, to indicate whether the manipulator transport is to be effected starting from the initial value, contained in this line, of the particular section, without forging strokes, i.e. whether a portion of the workpiece is to remain unforged.

With this type of programming of a workpiece, it is possible to make do with an extremely small number of control signals and change-over procedures, because the data of each workpiece section, which on reaching the initial position of this section are converted to control signals, are maintained unchanged in the control device during the forging of the entire section and a change is not effected until the initial position of the next workpiece section has been reached. Despite this extremely concise characterisation of the workpiece sections, it is possible to rotate the manipulator, in the manner intended in each particular instance, after each forging stroke or to repeat the same forging stroke without manipulator rotation.

For detecting the manipulator position, there may be provided at the input device a group of connecting locations at which, at least intermittently, a manipulator setting signal, generated by coding means, is supplied. The said connecting locations, whereof some are connected to associated contacts, therefore always supply the control device with information as to whether the initial position of the next-following workpiece section has or has not already been reached. If it has not yet been reached, then the manipulator and forging press movement is still effected in accordance with the data fed-in and to correspond to the previous signal group. If, however, the initial position of the new sections has already been reached, then cancellation of the control signals of the previous section and storage of the data of the fresh section are effected.

The input device may be so designed that predetermined functions are alotted to predetermined contacts. In such cases, it is necessary to pay strict attention to ensuring that the particular connecting locations, indicating for example the values for the lower and upper ram dead centres, are connected only to those contacts which are predetermined for the upper or lower ram dead centre. In order to achieve greater flexibility of the input device and to diminish the possibility of programming errors, according to a further development of the invention the contacts of the input device may be combined groupwise in logic gates, the components supplying the function data may be cut in or switched on individually one after the other, and the said components may supply logic signals to those contacts which are connected to the connecting locations connected with the components.

With this arrangement, signal conversion of the signals supplied by the individual components is effected in "time-selective" manner, each component being individually "activated", alone, for a predetermined length of time. The remaining components (or "assemblies") uniformly supply, depending on the nature of the logic system selected, either O- or L-signals. Those components which are not activated at a predetermined instant have the same influence on the evaluation of the logic gates as non-loaded contacts. The result of this is that, at a predetermined instant, there is detected during the evaluation of a signal group only that component which precisely at that instant is alone activated, so that fundamentally it is no longer significant with which contact within a group a predetermined connecting location is connected. On the contrary, the only important factor is that for example the connecting location for repetition on one occasion only of each ram movement is only connected to any optional contact of the group if such a repetition is to be effected.

The same "time-selectivity" due to graded activation of the individual components is advantageously made use of in that all the contacts of a group are combined in a NOR gate and are individually connected via connecting locations with the components, in that the components to be cut in one after the other supply the particular O-signals in the switched-off condition and, in the switched-on condition, L-signals or combinations of L-signals with O-signals, and in that those inputs of the NOR gate at which there is no voltage operate as if they had O-signals.

As is known, a NOR gate supplies an L-signal at the output only if all its input signals are O-signals. This condition is always satisfied for those inputs which are not, precisely at that instant, activated. For obtaining the L-signal at the output, it is then merely necessary that also those contacts should carry O-signals which are connected with any optional connecting location. If the component cut in in any particular instance supplies O-signals in the combination switched on at the input device, then the NOR gate switches through and produces a switching step, for example the storage of the value just set in the component.

An example of embodiment of the device according to the invention is discussed in greater detail hereinbelow with reference to the figures of the drawings.

Figure 3:
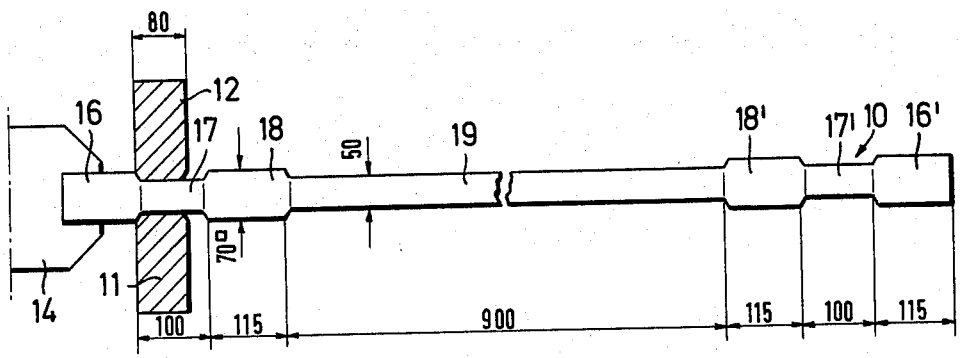
Figure 4:
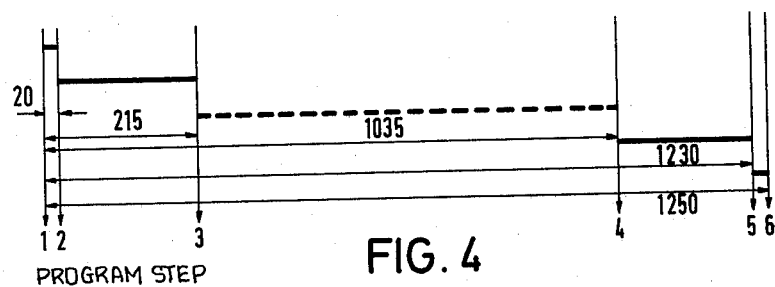
Figure 2:
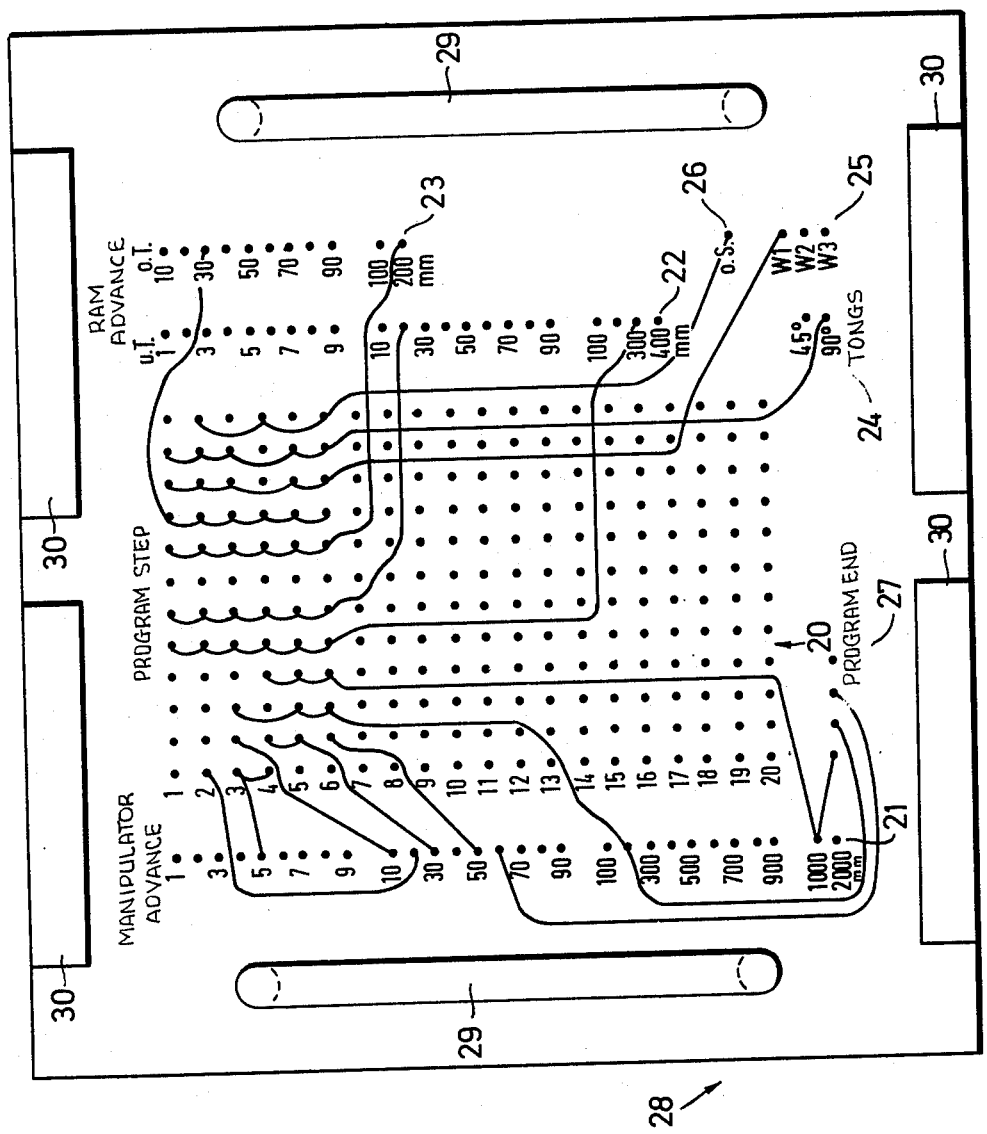
Figure 5:
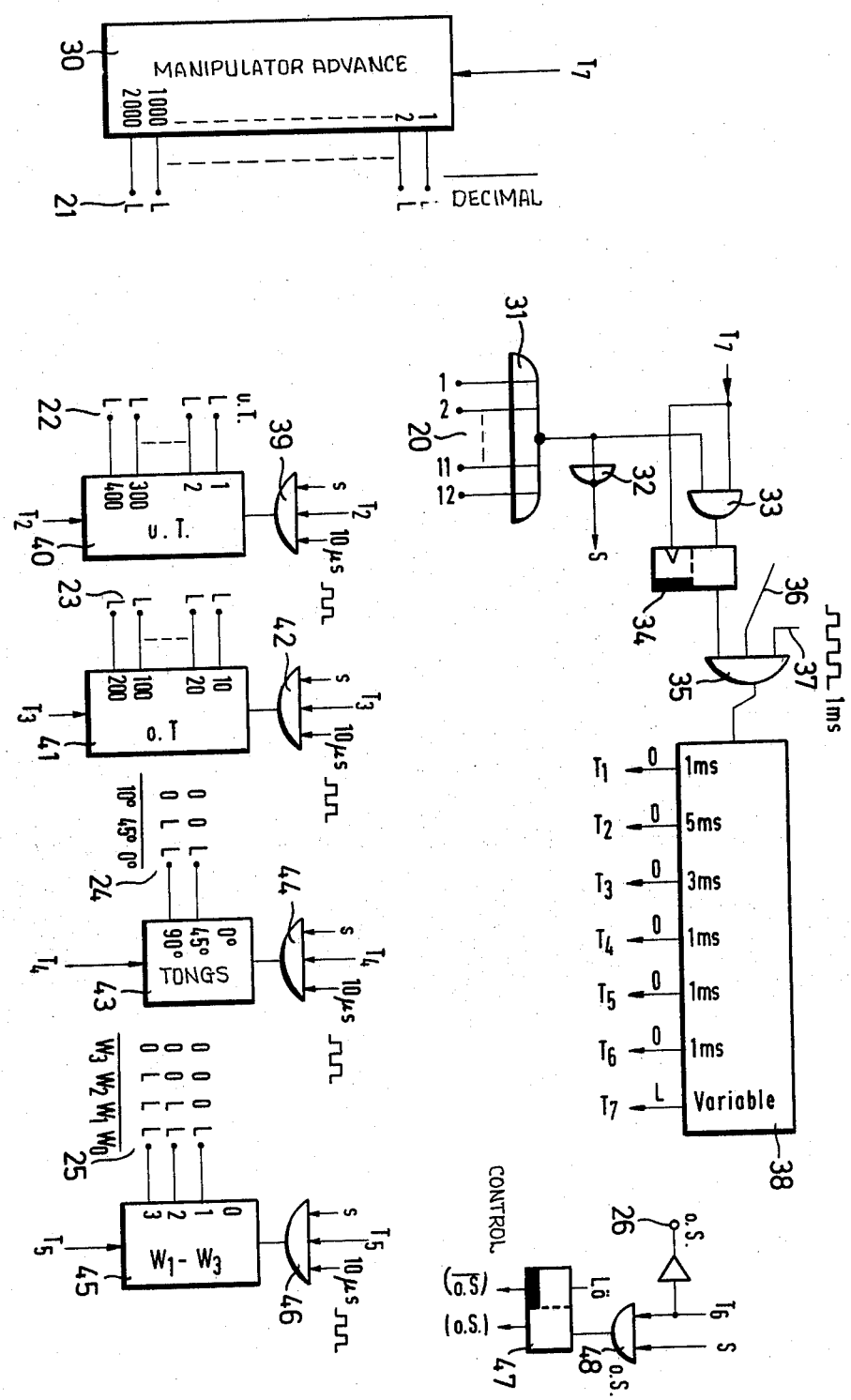

FIG. 1 shows, diagrammatically, a view of a hammer-forging press having a manipulator, during the processing of a workpiece, FIG. 2 shows a view of an input device programmed for the forging of a workpiece, FIG. 3 shows the shape of the workpiece programmed at the input device according to FIG. 2, FIG. 4 shows the individual operational or programming sections as a function of the manipulator transport travel-path, and FIG. 5 shows the various components (or assemblies) connected to the input device.

Referring to the hammer-forging press according to FIG. 1, the workpiece 10, which is for example to be processed to a vehicle axle, is laid on the lower stationary ram 11 and processed with the upwardly and downwardly reciprocating upper ram 12. For the processing of the workpiece, in particular the setting of the lower dead centre of the ram 12 is significant, since thereby the thickness of the processed portion of the workpiece is predetermined. The workpiece 10 is retained at one end by the manipulator 13 which is horizontally displaceable on rails. For this purpose, there is provided at the manipulator 13 tongs means 14 gripping the workpiece 10 at the end face, and which is selectively pivotal through 45° or 90° about the workpiece axis, so that it is possible for example also to round-forge the workpiece.

Attached to the manipulator is coding means (not shown) converting the manipulator travel path, related to the forging press, to electrical signals. In this manner, on the one hand the position of the manipulator relative to the two rams 11 and 12 is ascertained, and on the other hand there is also ascertained that length of the workpiece 10 which has already travelled-through between the rams 11,12 or that location on the workpiece which is just at that instant being processed. The coding means may for example consist of a subtense bar attached along the rails 15 on which the manipulator is displaceable and provided with a bar pattern (line raster or grid) scanned by an optical device the manipulator. However, also numerous other types of position transducers are known which are suitable for conversion of the manipulator position into electrical signals, so that it will be unnecessary to discuss the constructional design here.

The workpiece to be cut — in the present case a vehicle axle — is shown in FIG. 3, the dimensional data shown representing mm data. The vehicle axle is to be forged from a square bar having an edge length of 70 mm. Starting from an unmachined section 16, a section 17 having a length of 100 mm and of reduced cross-section is to follow, and this is again followed by an unmachined section 18 having a length 115 mm, and finally, a section 19 900 mm long in which the cross-section has been reduced to an edge-length of 50 mm. There then follow the sections 18', 17' and 16' corresponding in respect of their dimensions to the sections 18, 17 and 16.

The rams 11,12 which, in cross-section, are square, have an edge length of 80 mm. From this there is derived the diagram, shown in FIG. 4, representing the operation development for the control of the manipulator and the upper ram 12. After a manipulator advance of 20 mm, manufacture of the section 17 is completed. This means that the first programme step extends through 20 mm. Then follows the second programme step up to a length of 215 mm, calculated from the zero-point. The said second programme step is effected without forging strokes, i.e. the manipulator is advanced by a distance corresponding to the section 18, without the workpiece being forged. Then, at the commencement of the third programme step, renewed forging strokes commence, up to the instant at which the manipulator is 1035 mm distant from the zero-point. There then follow the fourth, fifth and sixth programme steps for producing the sections 18', 17' and 16'.

The switching of these programme steps is shown in detail on the input device shown in FIG. 2. The input device comprises a series of contact locations, taking the form of solder-points or plug sockets. The contact locations may be interconnected by means of flexible lines.

Located in the centre of the input device is a contact field 20 in which the contacts are arranged, in raster or grid configuration, in lines and columns. The contact field contains a total of twelve columns and twenty lines of contacts. The contacts of one line each constitute a group. Thus, there are twenty contact groups. Arranged on the left of the contact field 20 is a row of decade-arranged connecting locations 21 for the manipulator travel path. The connecting locations 21 are, constructionally, designed in the same manner as the contacts of the contact field 20. They are each arranged in groups of tens for units, tens, hundreds, and in a further group for one thousand and two thousand, and are appropriately lettered. The lettering relates in every particular instance to mm data.

Disposed on the right-hand side of the contact field 20 are two further rows 22,23 of connecting locations. These serve for indicating the movement of the upper ram 12, i.e. for marking the lower dead-centre and the upper dead-centre of the ram movement. The upper ram-point of the press is so controlled, as a function of workpiece operation, that in every case only a minimal ram travel path is necessary up to the following forging stroke. The row 22 is provided for the lower dead-centre. It comprises ten connecting locations for the units, ten connecting locations for the tens and four connecting locations for the hundreds, from one hundred to four hundred. The connecting locations are, as will be preceived in the drawing, lettered. The lettering relates to the mm unit. The row for the upper dead-centre of the ram 12 comprises only ten tens and also two hundreds, because the adjustment of the upper ram reversing point is much less critical than the adjustment of the lower ram reversing point on which, of course, the workpiece dimensions directly depend.

Provided on the input device are furthermore two connecting locations 24 for rotating the manipulator tongs or grippers 14, i.e. a connecting location for a 45° rotation and a connecting location for a 90° rotation.

The connecting locations 25 designated W1 to W3 indicate a repetition effected on one occasion only or on three occasions of the ram movement without manipulator transport, so that multiple processing of the workpiece at the same location takes place. Finally, there is also a further connection location which is then cut in if manipulator transport is to be effected "without forging strokes".

The four connecting locations 27 represent the end of the programme.

Constructionally, the input device 28 is designed as a plane plate having at the front sides contacts or connecting locations in the form of soldering points or connecting sockets and provided with handles 29 for facilitating replacement. The plate is provided with a series of plugin devices 30 with which it is connected with a control device (to be discussed later).

As already mentioned, the individual groups of contacts of the contact field 20 are arranged line-wise and appropriately numbered from 1 to 20. Each of the groups is able to receive the data of a programme step. This will be discussed with reference to the example of the programme illustrated in the drawing.

During the programme step 1, during which the section 17 of the workpiece is to be forged, the lower dead-centre of the ram 12 is, to correspond to the workpiece thickness of 0 mm required at this location, to be fixed at 320 mm. This means that any optional contact of the first line (uppermost line) must be connected with the connecting location 300 of row 22 and a further contact of the first line must be connected with the connecting location 20 of row 22.

For the upper dead-centre of the ram 12, a value of 230 mm (measured in each particular instance from the maximum possible stroke height) is selected. Thus, it is necessary to contact a further point on the first line of the contact field with the connecting location 200 of the row 23 and a further point of the contact field 20 with the connecting location 30 of the row 23.

Since the section 17 of the workpiece is to be forged as a square piece, for the same manipulator advance it is necessary to effect two forging strokes, accompanied by rotation of the workpiece 10 through 90°. For this purpose, a further contact of the first line of the contact field is connected with the connecting location W1 of row 25 and yet a further contact of the first line with connecting location 90° of row 24. This means that each forging stroke is repeated, meanwhile rotating the tongs or gripper through 90°, without meanwhile effecting a manipulator advance.

Since forging strokes are to be effected in the zone of the section 17, the connecting location 26 ("without forging strokes") is not connected with a contact of the first line. On the other hand, it would be impossible to effect any forging stroke in the particular section. Further-transport would then take place at higher velocity.

The circumstance that the first line of the contact field 20 is not connected to a value of row 21 for the manipulator travel-path means that the corresponding programme step commences at zero, as will quite readily be appreciated from FIG. 4.

The second programme step commences after the manipulator has travelled 20 mm out of its inoperative position. Thus, in the second line of the contact field 20 one of the contacts is connected with the connecting location 20 of row 21. The remaining connections are the same as in the first line, save for the fact that one of the contacts is operated "without forging strokes", which means that no forging strokes are effected during the second programme step.

The third programme step, commencing at 215 mm (starting from zero-point) is programmed in line 3. Here, in each particular instance one of the contacts is connected with the connecting location 5, with the connecting location 10, and with the connecting location 200 of row 21. No connection to connecting location 26 ("without forging stroke") takes place. The remaining connections are the same as in lines 1 and 2. This means that the ram 12 performs, from initial position at 215 mm on, forging strokes having a lower dead centre of 320 mm and an upper dead centre of 230 mm, whereby first of all two forging strokes offset through 90° at the same location are effected and then the manipulator transport is again operated with continuous advance, during further performance of the forging strokes and of the 90° tongs rotation necessary after each forging stroke. This processing or machining of the section 19 is continued until a manipulator position of 1035 mm is reached. Then follows programme step 4 which is switched in the same way as programme step 2, save for the fact that there is a different initial value. This difference shows itself in that, in line 4 of the contact field 20, one contact is connected with connecting location 1000, a further contact with connecting location 30 and a third one with connecting location 5 of row 21.

For the sections 17' and 16', programming is continued in the manner already described. The end programme or switch-off of the machine is predetermined for a manipulator position of 1260 mm. Thus, the corresponding connecting locations of row 21 are connected with the "programme end" connecting locations of row 27.

From the portion of the description hitherto set forth, it is clear how simply and relatively readily comprehensibly programming of the forging steps of a workpiece is effected. In the following text, there will now be given a discussion of the signal conversion or signal evaluation (with reference to FIG. 5).

The connecting location row 21 according to FIG. 4 constitutes, as FIG. 5 shows, the output of a coder 30 converting the manipulator travel path or the manipulator position to output signals arranged decimal-wise. This conversion is, however, effected only if there is present at the coder 30 a signal the generation of which will be discussed hereinbelow. In the non-activated condition, i.e. if the signal $T_7$ is not present, all the connecting locations of the row 21 have 0-signals. If the signal $T_7$ is present, then the manipulator position is expressed by 0-signals of which in each particular instance at maximum one is present in a decade.

All the contacts of each group or of each line of the contact field 20 are combined in a NOR gate 31. Consequently, to correspond to the number of groups, there is a total of twenty NOR gates, which, spatially, may be attached to the rear side of the plate 28. The circuits connected to the NOR gates are identical. Thus, it will suffice, here, to limit the description to one of the said circuits.

Connected to the output of the NOR gate 31 is a reversing amplifier 32 to the output S of which L-signals are always supplied, save for the condition wherein all the contacts 20 of the particular line carry 0-signals. In that case, there is an 0-signal also at the output S. The output S is employed for the automatic cut-out of the various components, so as to effect the switch-off procedure when the value preprogrammed at the input device has been reached and all the outputs of the NOR gate have 0-signals.

The inputs to the NOR gate 31 is furthermore connected to an AND circuit 33 across the further input of which the already-mentioned clock signal $T_7$ is connected. The said clock signal is furthermore connected to the backspace inputs, designed as dynamic input, of a bistable flip-flop or trigger stage 34 the setting input of which is connected to the output of the AND gate 33. The output of the bistable trigger stage 34 is connected to one input of an AND gate 35. A further input line 36 of the AND gate 35 extends from a control or keying device and indicates when the particular operative forging stroke of the ram 12 is completed. The third input line 37 is connected to a pulse source supplying square-wave pulses having a recurrence frequency of 1 m/s.

The output of the AND gate 35 is connected to a pulse generator (master clock) 38 generating, in one period, a total of seven different output signals, with varying chronlogical intervals, at the lines $T_1$ to $T_7$. The period of the output signals appearing in the sequence of the numbering at the outputs $T_1$ to $T_7$ is shown in each instance in the drawing.

The output $T_2$ is connected to the input of an AND gate 39 connected with a decadic binary counter 40. Connected to the further two inputs of the AND gate 39 is the aforementioned line S and also a clock frequency of 10 µs. The outputs of the counter 40 constitute the connecting locations 22 (FIG. 2). The counter 40, which serves for producing the binary value for the lower dead centre, is, like the other counters and switching devices used here, so designed that it is in the zero position when an L-signal is present at all its outputs. On counting, practically speaking an 0-signal travels along the counter output lines. The counter output signal is activated by the clock signal $T_2$, i.e. it is connected only during the period of 5 ms of the clock signal $T_2$ to the connecting locations of row 22. Furthermore, although it does exist in the counter 40, it does not reach the outputs.

In similar manner, the counter 41 is designed to ascertain the value for the upper dead-centre. The output of the counter 41 is constituted by the connecting locations 23 (FIG. 2). Connected to the input is an AND gate having three inputs one of which carries s-signals, the other clock signals $T_3$ and the third the 10 µs pulse frequency. The outputs 23 of the counter 41 are adapted to be activated by the clock signal $T_3$.

Also the adjusted value for rotation of the manipulator tongs is ascertained via a counter 43. What is concerned here is a two-stage counter the outputs of which constitute the connecting locations 24. Connected before the counter, the output signal of which is activated by the clock signal $T_4$, is an AND gate 44 at one input of which the signal s is present, whereas the signal $T_4$ is present at the second input thereof and the 10 µs clock signal at the further input thereof.

A further counter 45 serves for producing the signals W1 to W3. Thus, it generates the required number of repetitions of the ram strokes, without manipulator transport. Connected before the counter 45, the output of which is activated by the signal $T_5$, is an AND gate 46. At the three inputs there are the signal s, the clock signal $T_5$ and the 10 µs clock signal.

The mode of operation of the clock or pulse control arrangement shown in FIG. 5 is discussed hereinbelow:

As already stated, the outputs of the various components are activated or called-in one after the other by the clock signals $T_1$ to $T_7$. If the outputs are not activated, they all carry 0-signals and thus to this extent satisfy the requirement of the NOR gate 31. The only component which is able to supply L-signals to the NOR gate 31 is that component which is activated in each particular instance. If this activated component has 0signals at those lines which extend from the connecting locations to the contacts of the contact field 20, then the NOR gate 31 switches-through. Simultaneously, the output s of the reversing amplifier 32 drops to zero.

The first programme step is, according to the wiring of the first line of the contact field 20 in FIG. 2, initiated when the manipulator is in the zero position. In this case, during the setting-up of the clock signal $T_1$, the condition of the NOR gate 31 is satisfied. After 1 ms, the clock pulse generator 38 is changed over to $T_2$. The outputs of the coder 30 and of the remaining components, with the exception of the counter 40, now all supply 0-signals. Thus, due to the output signal set up at the counter 40, and which first of all consists purely of L-values, the NOR-condition of the gate 31 is not satisfied. Thus, the line s carries L-signals, this affords the prerequisite ensuring that the AND gate 39 transmits the 10 μs clock signal to the counter 40. The counter 40 counts in accordance with the clock signal and its outputs accept the various signal combinations, there always being present in each decade, at maximum, an 0-signal. If these 0-signals correspond to the value 200 and 30, then the NOR condition of the gate 31 is satisfied, the gate switches-through and 0-signals are set up at the line s. Thereby, the AND gate 39 is blocked. The counter state of the counter 40 can no longer be counted-on and remains, for the time being, stored in the counter.

After expiry of the clock or pulse time $T_2$, pulse $T_3$ is cut in. The counter 41 is operated in the same manner, thereby controlling the NOR gate 31 until the outputs or connecting locations connected to the contacts of the corresponding line carry 0-signals. Then the NOR gate 31 responds and brings about, via line s, the switch-off of the counter 41. The same mode of procedure is effected with the counters 43 and 45, so that the latter have, after travelling oncethrough the pulse times $T_1$ to $T_7$ stored those values which require to be passed-on directly to the machine, in order to carry out the appropriate orders.

A special feature resides in the switching of the connecting location 26 for the order signal "without forging strokes". The corresponding clock pulse $T_6$ is present at the input of an AND gate 48 at the further input of which the automatic cut-out signal s is present. The output of the AND gate 48 is present at the input of the bistable trigger stage 47 at the backspace (reset) input of which there is a cancelling signal Lo.

The "without forging stroke" signal is generated for the period of the pulse $T_6$ of 1 ms and supplied to the connecting location 26. Simultaneously, the bistable trigger stage 47 is set. If "without forging strokes" is connected to a contact of the associated line, then at instant $T_6$ the NOR gate 31 responds. This means that an 0-signal builds up at line s and the AND gate 48 closes. If, on the other hand, no contact of the appropriate line is connected with the connecting location 26, then on appearance of the clock signal $T_6$ an os signal arrives at the line. Thereby, the AND gate 48 is blocked and is not able to set the trigger stage 47. Thus, it will be appreciated that the trigger stage 47 always adopts, in the time interval $T_6$, that condition which corresponds to the connection of the line to be investigated with the connecting location 26.

The switching conditions of the components 40, 41, 43, 45 and 47, in the particular switch-off condition, which first of all remains stored, are subsequently supplied as binary control signals to the machine control unit.

The following table will serve for a discussion of the functional developments in the individual clock times $T_1$ to $T_7$.

Table

| Clock No. | Time | Remarks: |
|---|---|---|
| $T_1$ | about 1 ms | a) "Stop" order for manipulator transport b) cancel the data stores of pulses $T_2$ to $T_6$ |
| $T_2$ | about 5 ms | Data storage of lower ram dead centre |
| $T_3$ | about 3 ms | Data storage of upper ram dead centre |
| $T_4$ | about 1 ms | Data storage 0° or 45° or 90° of the tongs rotation |
| $T_5$ | about 1 ms | Dta storage W or W1, W2 or W3 for forging strokes without manipulator transport |
| $T_6$ | about 1 ms | Data storage without forging strokes or without forging strokes for manipulator transport without forging strokes, effected after at least 1 forging stroke or W2, W2 or W3. |
| $T_7$ | about 1 ms | a) change-over to the next programme step. Fresh manipulator travel-path desired value in preparation. b) control orders for forging and manipulator transport after data storage, pulse 2 to 6 |

13 ms. maximum cycle time.

Thus, it will be appreciated that the values stored in the pulses $T_2$ to $T_6$ are ascertained only once (in the manner discussed hereinabove) and then remain stored up to termination of processing of the particular section of the workpiece. Such termination is ascertained in that the value supplied by the coder 30 brings about the switch-through of the next-following NOR gate 31 which then provides for storage of the data of the next workpiece section.

A special advantage of the device according to the invention resides in that the processing data of a workpiece section merely requires to be switched groupwise, without it being necessary to maintain a predetermined order within the group (line of a contact field). This enhances flexibility in programming and facilitates in particular also subsequent changes. Furthermore, it enables the device to effect changes even when the machine is already operative.

We claim:

1. In a system for selectively establishing a program of forging a workpiece in which a workpiece is translated with respect to a forging ram under control of a manipulator, the combination of:
    a contact field including a plurality of separate rows of contacts, a first group of contacts and at least one further group of contacts;
    coder means having a plurality of output lines connected with said first group of contacts for producing patterns of signals of one value on said output lines in accord with the position of the manipulator;
    a plurality of connectors selectively connected between said first group of contacts and a sequential set of said rows of contacts;
    sequencing means for producing a sequence of signals;
    first gate means for controlling said sequencing means to initiate said sequence of signals when all of the inputs from said coder means as connected to a row are of said one value;
    a plurality of further connectors selectively connected between said second group of contacts and selected ones of said set of rows;
    data storage counter means having a plurality of output lines connected with said second group of contacts for producing signals of said one value in accord with the count stored therein;
    a source of count storage pulses; and second gate means connecting said source of count storage pulses to said counter means only in response to one of said sequence of signals for controlling said sequencing means to produce the next signal of said sequence when all of the inputs from said data storage counter means as connected to a row are of said one value.

2. In a system as defined in claim 1 wherein said data storage counter means controls the bottom dead center position of the forging ram and including a second data storage counter means and an associated third group of contacts for controlling the top dead center position of the forging ram.

3. In a system as defined in claim 2 including a third data storage counter means and an associated fourth group of contacts for controlling rotation of the workpiece manipulator.

4. In a system as defined in claim 3 including a fourth data storage counter means and associated fourth group of contacts for controlling the number of strokes of the forging ram.

5. In a system as defined in claim 1 wherein said data storage counter means controls the bottom dead center position of the forging ram and including a further data storage counter means and associated further group of contacts for controlling rotation of the workpiece manipulator.

6. In a system as defined in claim 1 wherein said data storage counter means controls the bottom dead center position of the forging ram and including a further data storage counter means and associated further group of contacts for controlling the number of strokes of the forging ram.

7. In a system as defined in claim 1 wherein said contact field includes a "no stroke" contact, and including connector means for selectively connecting said "no stroke" contact to said rows of contacts, and including circuit means connected to one of said sequence of signals for storing a "no stroke" signal.

8. In a system for selectively establishing a program of forging a workpiece in which a workpiece is translated with respect to a forging ram under the control of a workpiece manipulator, the combination of:
a contact field including a plurality of rows of contacts;
a plurality of gate means, each one connected with inputs of the contacts of a different row, for producing data storage terminating signals when all of said inputs are of one value;
coder means connected with the workpiece manipulator and having a plurality of output lines for producing signals of said one value in accord with the translated position of the workpiece manipulator;
sequencing means connected to the outputs of said gate means for initiating a sequence of signals when all of the inputs from said coder means to any of said gate means are of said one value;
said contact field also including a first group of contacts connected with said output lines of the coder means;
connector means for connecting selected ones of the contacts of said first group to contacts of selected rows whereby those gate means associated with said selected rows actuate said sequencing means at different translated positions of the workpiece;
a bank of data storage means for storing data until terminated by said data storage terminating signals, each having a plurality of output terminals at which signals of said one value appear in accord with data stored;
said contact field including further groups of contacts, each group connected with the output terminals of a different data storage means;
the sequence of signals produced by the sequencing means comprising a first signal which commands cessation of workpiece manipulator translation and a series of signals which enable successive data storage in said data storage means, followed by a signal which causes further translation of the workpiece manipulator; and
connector means for selectively connecting contacts of said further groups of contacts with said rows of contacts.

9. In a system for selectively establishing a program of forging a workpiece in which a workpiece is translated with respect to a forging ram under control of a manipulator, the combination of:
a contact field including a plurality of rows of contacts;
a plurality of gate means, each having its inputs connected to a different row of said contacts for producing an output in response to signals of one value at its inputs;
coder means connected to the workpiece manipulator and having a plurality of output lines for producing patterns of signals of said one value in accord with the translated position on the manipulator;
said contact field also including a first group of contacts connected to said output lines of said coder means;
connector means for connecting selected contacts of said first group with contacts of different rows whereby the so-connected contacts of each of said different rows will receive signals of said one value when the workpiece manipulator is in a particular position;
sequencing means connected to the outputs of said gate means for initiating a sequence of signals whenever said output of a gate means is produced by the pattern of signals produced by said coder means, whereby said sequence of signals is initiated only in response to the particular positions of said workpiece manipulator corresponding to the selected connections of said connector means;
said contaxt field further including at least one further group of contacts;
data storage means having a plurality of output lines connected to said further group of contacts;
further connector means for connecting selected contacts of said further group of contacts with contacts of said different rows whereby said data storage means may be updated with data according to the so-connected further group of contacts, said data storage means normally producing signals of said one value on the output lines thereof;
means for storing data in said data storage means in response to a signal of said sequence of signals and for simultaneously causing the output lines of said data storage means to produce patterns of signals of said one value in accord with the data stored; and
means for terminating said data storage when said gate means produces said output signal by said patterns of signals produced by said means for storing data.

10. In a system for selectively establishing a program of forging a workpiece in which a workpiece is translated with respect to a forging ram under control of a manipulator, the combination of:
- a contact field including a plurality of rows of contacts and at least a group of control contacts;
- coder means having a plurality of output lines connected with said group of control contacts for initiating patterns of position signals on said output lines in dependence upon the translated position of the workpiece as effected by the manipulator;
- at least one connector connecting a certain contact of the group of control contacts to a contact of at least one row of said plurality of rows of contacts, said certain contact corresponding to a particular pattern of said position signals indicating a predetermined position of the workpiece;
- sequencing means connected to said one row of contacts for producing a sequence of control signals when said particular pattern of position signals appear at said one row, said sequence of control signals comprising a first control signal for stopping motion of the manipulator and a predetermined number of further control signals;
- said contact field including a plurality of further groups of contacts;
- a plurality of data storage means for controlling the forging process, each having outputs connected to a corresponding further group of contacts;
- at least one connector connecting a contact of one of said further groups of contacts to a contact of said one row whereby to establish a program of data storage in that data storage means connected to said one further group of contacts; and
- data input means connected to all of said data storage means for storing data therein in response to one of said further control signals and the simultaneous presence of programming connection between that further group of contacts corresponding to the data storage means and said one row of contacts.

11. In a system for selectively establishing a program of forging a workpiece in which a workpiece is translated with respect to a forging ram under control of a manipulator, the combination of:
- a contact field including a plurality of rows of contacts, a group of control contacts, and a plurality of further groups of contacts;
- coder means having a plurality of output lines connected with said group of control contacts for producing patterns of position signals on said output lines in dependence upon the translated position of the workpiece as effected by the manipulator;
- first connector means for selectively connecting contacts of said group of control contacts to different rows of said contacts whereby the connections to said different rows correspond to different patterns of said position signals representing progressively greater movements of said manipulator;
- sequencing means connected to each of said different rows of contacts for producing a sequence of control signals in response to the appearance of each of said different patterns of said position signals, whereby said sequence of control signals is initiated for each of said different rows when the corresponding position of said manipulator is reached;
- a plurality of data storage means for controlling the forging process, each having outputs connected with a corresponding group of said further contacts;
- second connector means for selectively connecting contacts of said further groups of contacts with contacts of said different rows of contacts whereby different program patterns of connection are made between contacts of said different rows of contacts and contacts of said further groups of contacts;
- one of said sequence of signals being connected to clear data from all of said data storage means and subsequent signals of said sequence enabling different ones of said data storage means for data storage; and
- data input means connected to all of said data storage means for storing data therein according to said program patterns effected by said second connector means and in response to the appearance of the appropriate one of said subsequent signals of said sequence whereby those data storage means programmably connected with any one of said different rows of contacts are up-dated when the manipulator reaches a position corresponding to such row of contacts correspondingly to control the forging operation at least until the manipulator reaches a position corresponding to the next row of contacts.

* * * * *